US012600122B2

(12) United States Patent
Hirashima

(10) Patent No.: US 12,600,122 B2
(45) Date of Patent: Apr. 14, 2026

(54) LIQUID DISCHARGE HEAD AND RECORDING DEVICE

(71) Applicant: KYOCERA CORPORATION, Kyoto (JP)

(72) Inventor: Akinori Hirashima, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 167 days.

(21) Appl. No.: 18/574,304

(22) PCT Filed: Jun. 30, 2022

(86) PCT No.: PCT/JP2022/026310
§ 371 (c)(1),
(2) Date: Dec. 27, 2023

(87) PCT Pub. No.: WO2023/282182
PCT Pub. Date: Jan. 12, 2023

(65) Prior Publication Data

US 2024/0308206 A1 Sep. 19, 2024

(30) Foreign Application Priority Data

Jul. 8, 2021 (JP) ................................ 2021-113803

(51) Int. Cl.
*B41J 2/045* (2006.01)
*B41J 11/00* (2006.01)

(52) U.S. Cl.
CPC ......... *B41J 2/0453* (2013.01); *B41J 2/04581* (2013.01); *B41J 11/002* (2013.01)

(58) Field of Classification Search
CPC .. B41J 2/0453; B41J 2/04531; B41J 2/04533; B41J 2/04535; B41J 2/04536; B41J 2/04538; B41J 2/04543; B41J 2/04545; B41J 2/04546; B41J 2/04568; B41J 2/0457; B41J 2/04578
See application file for complete search history.

(56) References Cited

U.S. PATENT DOCUMENTS

2010/0171797 A1 7/2010 Lim et al.
2015/0022593 A1 1/2015 Fukuda

FOREIGN PATENT DOCUMENTS

JP 2007203733 A 8/2007
JP 2015037863 A 2/2015
JP 2018065391 A 4/2018

*Primary Examiner* — Kristal Feggins
(74) *Attorney, Agent, or Firm* — HAUPTMAN HAM, LLP

(57) ABSTRACT

A liquid discharge head includes a discharge unit including a nozzle, a pressurizing chamber, and a pressurizer and dummy units including a dummy pressurizing chamber and a dummy pressurizer. The liquid discharge head includes a discharge region where the discharge units is disposed in a row and a dummy region where one or more dummy units are disposed adjacent to the discharge region on an extended line of the row of the discharge units. The discharge region includes a central region located at the center of the row and an end portion region located adjacent to the dummy region at the end portion of the row.

13 Claims, 9 Drawing Sheets

LIQUID DISCHARGE HEAD AND RECORDING DEVICE

CROSS-REFERENCE TO RELATED APPLICATIONS

This application is national stage application of International Application No. PCT/JP2022/026310, filed on Jun. 30, 2022, which claims the benefit of priority from Japanese Patent Application No. 2021-113803, filed on Jul. 8, 2021.

TECHNICAL FIELD

The disclosed embodiments relate to a liquid discharge head and a recording device.

BACKGROUND OF INVENTION

A known printing apparatus is an inkjet printer or an inkjet plotter using an inkjet recording method. A liquid discharge head for discharging a liquid is mounted in such a printing apparatus using an inkjet method.

Such a liquid discharge head introduces, for example, a liquid in a reservoir, into a pressure chamber, applies a drive signal for operating a piezoelectric element, and discharges the liquid in the pressure chamber from a nozzle. In the configuration, a proposed technique disposes a dummy pressure chamber that does not discharge liquid at an end portion of a region of discharging liquid and improves discharge performance.

CITATION LIST

Patent Literature

Patent Document 1: JP 2015-37863 A
Patent Document 2: JP 2018-65391 A

SUMMARY

A liquid discharge head according to an aspect of an embodiment includes a discharge unit and a dummy unit. The discharge unit includes a nozzle configured to discharge a droplet, a pressurizing chamber connected to the nozzle, and a pressurizer supplied with a drive signal and configured to deform the pressurizing chamber. The dummy unit includes a dummy pressurizing chamber and a dummy pressurizer supplied with a drive signal and configured to deform the dummy pressurizing chamber. The liquid discharge head includes a discharge region and a dummy region. The discharge region is a region where a plurality of the discharge units is disposed in one row. The dummy region is a region where one or more of the dummy units are disposed adjacent to the discharge region on an extended line of the row of the discharge units. The discharge region includes a central region located at the center of the row and an end portion region located adjacent to the dummy region at an end of the row. The end portion region is a region where the discharge unit having a size of a dot larger than the discharge unit located in the central region is located. The dot is formed on a recording medium by a droplet discharged by an identical drive signal when the dummy unit is not driven. In the liquid discharge head, a drive signal is supplied to the dummy unit while the drive signal is being supplied to the discharge unit located in the end portion region.

DESCRIPTION OF EMBODIMENTS

Embodiments of a liquid discharge head and a recording device disclosed in the present application will be described in detail below with reference to the accompanying drawings. The present invention is not limited by the following embodiment.

There is still room for improvement in discharge performance in a liquid discharge head in which a dummy pressure chamber that does not discharge liquid is disposed at an end portion of a region where liquid is discharged.

Therefore, provision of a liquid discharge head and a recording device that can improve discharge performance is expected.

Printer Configuration

Figure 1:
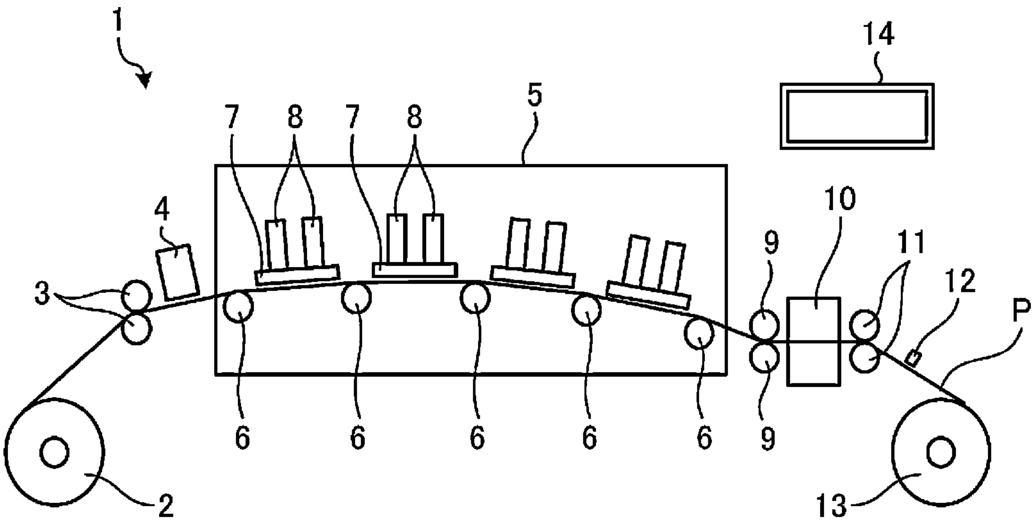
FIG. 1 is a front view schematically illustrating an overall front of a printer according to an embodiment.
Figure 2:
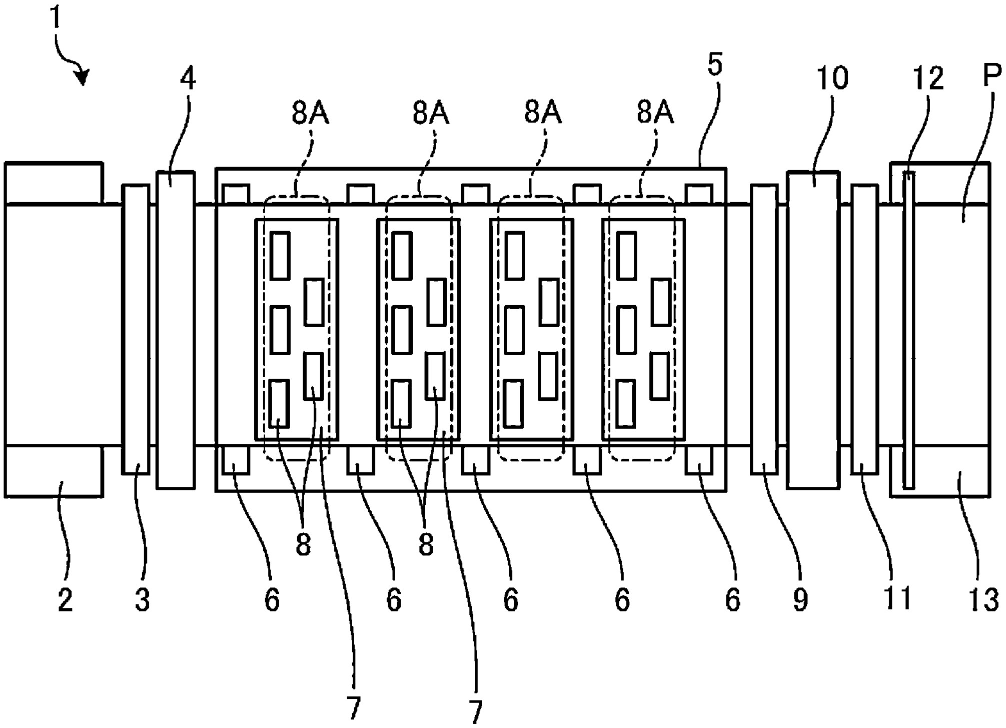
FIG. 2 is a plan view schematically illustrating an overall plan of a printer according to an embodiment.

First, with reference to FIG. 1 and FIG. 2, a description will be given of an overview of a printer 1 serving as an example of a recording device according to an embodiment. FIG. 1 is a front view schematically illustrating an overall front of a printer 1 according to an embodiment. FIG. 2 is a plan view schematically illustrating an overall plan of a printer 1 according to an embodiment. The printer 1 according to the embodiment is, for example, a color inkjet printer.

As illustrated in FIG. 1, the printer 1 includes a paper feed roller 2, guide rollers 3, an applicator 4, a head case 5, a plurality of transport rollers 6, a plurality of frames 7, a plurality of liquid discharge heads 8, transport rollers 9, a dryer 10, transport rollers 11, a sensor portion 12, and a collection roller 13. A transport roller 6 is an example of a transporter.

The printer 1 further includes a controller 14 configured to control each part of the printer 1. The controller 14 controls the operation of the paper feed roller 2, the guide rollers 3, the applicator 4, the head case 5, the plurality of transport rollers 6, the plurality of frames 7, the plurality of liquid discharge heads 8, the transport rollers 9, the dryer 10, the transport rollers 11, the sensor portion 12, and the collection roller 13.

The printer 1 records an image and a character on a printing sheet P by causing droplets to impact on the printing sheet P. The printing sheet P is an example of a recording medium. The printing sheet P is rolled on the paper feed roller 2 prior to use. The printer 1 conveys the printing sheet P from the paper feed roller 2 to the inside of the head case 5 via the guide rollers 3 and the applicator 4.

The applicator 4 uniformly applies a coating agent over the printing sheet P. This can perform surface treatment on the printing sheet P, improving the printing quality of the printer 1.

The head case 5 houses the plurality of transport rollers 6, the plurality of frames 7, and the plurality of liquid discharge heads 8. The inside of the head case 5 is formed with a space separated from the outside except for a part connected to the outside such as parts where the printing sheet P enters and exits.

As required, the controller 14 controls at least one of controllable factors of the internal space of the head case 5, such as temperature, humidity, and air pressure. The transport rollers 6 convey the printing sheet P near the liquid discharge heads 8 inside the head case 5.

The frames 7 are rectangular flat plates and are positioned above and close to the printing sheet P to be conveyed by the transport rollers 6. As illustrated in FIG. 2, the frames 7 are positioned having the longitudinal direction orthogonal to the conveyance direction of the printing sheet P. Inside the head case 5, the plurality of (e.g., 4) frames 7 is located at predetermined intervals along the conveyance direction of the printing sheet P.

A liquid, for example, ink, is supplied to the liquid discharge heads 8 from a liquid tank (not illustrated). The liquid discharge heads 8 discharge the liquid supplied from the liquid tank.

The controller 14 controls the liquid discharge head 8 based on data such as an image and a character to discharge a liquid toward the printing sheet P. The distance between each liquid discharge head 8 and the printing sheet P is, for example, approximately 0.5 mm to 20 mm.

Each of the liquid discharge heads 8 is fixed to the frame 7. The liquid discharge heads 8 are positioned having the longitudinal direction orthogonal to the conveyance direction of the printing sheet P.

That is, the printer 1 according to the embodiment is a so-called line printer in which the liquid discharge heads 8 are fixed inside the printer 1. Note that the printer 1 according to the embodiment is not limited to a line printer and may also be a so-called serial printer.

The serial printer is a printer employing a method of alternately performing operations of recording while moving the liquid discharge heads 8 in a manner such as reciprocation in a direction intersecting (e.g., substantially orthogonal to) the conveyance direction of the printing sheet P, and conveying the printing sheet P.

As illustrated in FIG. 2, a plurality of (e.g., five) liquid discharge heads 8 are fixed to one frame 7. FIG. 2 illustrates an example in which three liquid discharge heads 8 are located on the forward side and two liquid discharge heads 8 are located on the rear side, in the conveyance direction of the printing sheet P. Further, the liquid discharge heads 8 are positioned without their centers overlapping in the conveyance direction of the printing sheet.

The plurality of liquid discharge heads 8 positioned in one frame 7 form a head group 8A. Four head groups 8A are positioned along the conveyance direction of the printing sheet P. The liquid discharge heads 8 belonging to the same head group 8A are supplied with ink of the same color. As a result, the printer 1 can perform printing with four colors of ink using the four head groups 8A.

The colors of the ink discharged from the respective head groups 8A are, for example, magenta (M), yellow (Y), cyan (C), and black (K). The controller 14 can print a color image on the printing sheet P by controlling the respective head groups 8A to discharge the plurality of colors of ink onto the printing sheet P.

Note that a surface treatment may be performed on the printing sheet P, by discharging a coating agent from the liquid discharge head 8 onto the printing sheet P.

The number of the liquid discharge heads 8 included in one head group 8A or the number of the head groups 8A mounted on the printer 1 can be appropriately changed according to a printing target and a printing condition. For example, if the color to be printed on the printing sheet P is a single color and the range of the printing can be covered by a single liquid discharge head 8, only a single liquid discharge head 8 may be provided in the printer 1.

The printing sheet P printed inside the head case 5 is conveyed to the outside of the head case 5 by the transport rollers 9 and passes through the inside of the dryer 10. The dryer 10 dries the printing sheet P printed. The printing sheet P dried by the dryer 10 is transported by the transport rollers 11 and then collected by the collection roller 13.

In the printer 1, by drying the printing sheet P with the dryer 10, it makes it possible to suppress bonding, or rubbing of an undried liquid, between the printing sheets P overlapped with each other and rolled at the collection roller 13.

The sensor portion 12 includes a position sensor, a speed sensor, or a temperature sensor. Based on information from the sensor portion 12, the controller 14 can determine the state of each part of the printer 1 and control each part of the printer 1.

In the printer 1 described above, the printing sheet P is the printing target (i.e., the recording medium), but the printing target in the printer 1 is not limited to the printing sheet P, and a roll type fabric or the like may be the printing target.

The printer 1 may convey the printing sheet P put on a conveyor belt instead of directly conveying it. Using the conveyor belt allows the printer 1 to use a sheet of paper, a cut cloth, wood, a tile, or the like to be printed.

The printer 1 may discharge a liquid containing electrically conductive particles from the liquid discharge heads 8, to print a wiring pattern or the like of an electronic device. The printer 1 may make chemicals by causing the liquid discharge head 8 to discharge a predetermined amount of a liquid chemical agent or a liquid containing a chemical agent toward a reaction vessel or the like.

The printer 1 may also include a cleaner for cleaning the liquid discharge heads 8. The cleaner cleans the liquid discharge head 8 by, for example, a wiping process or a capping process.

The wiping process is, for example, a process of wiping a surface of a portion from which a liquid is discharged using a flexible wiper, thereby removing the liquid attached to the liquid discharge head 8.

The capping process is performed as follows, for example. First, a cap is put to cover a portion to which liquid is discharged, for example, a second surface 21*b* (see FIG. 6) of a channel member 21 (this is called capping). As a result, a substantially sealed space is formed between the second surface 21*b* and the cap.

The discharge of liquid is then repeated in such a hermetically sealed space. This makes it possible to remove a liquid, a foreign matter, or the like clogged in a discharge hole (nozzle) 163 (see FIG. 6) and having viscosity higher than that in a standard state.

Configuration of Liquid Discharge Head

Figure 3:
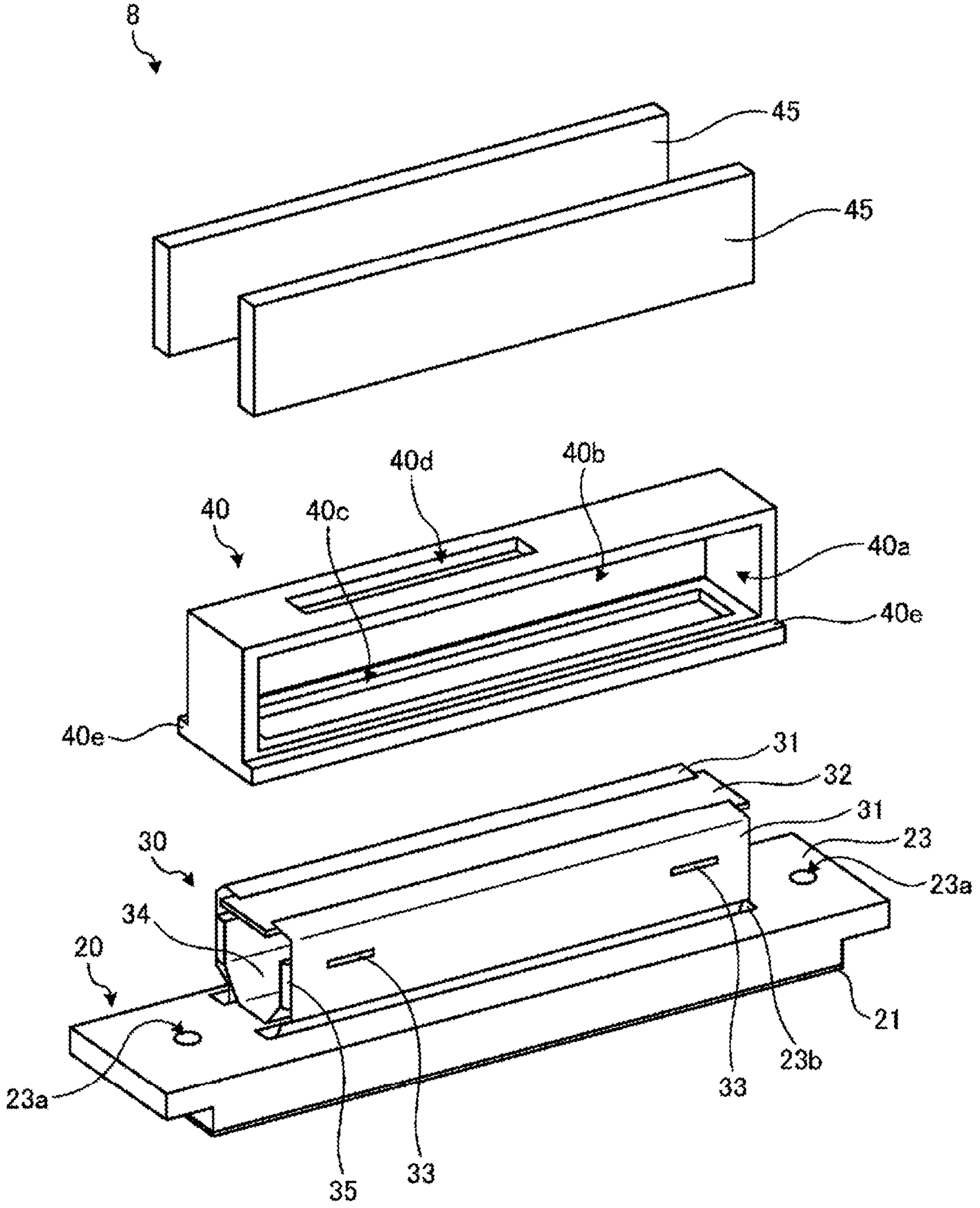
FIG. 3 is an exploded perspective view illustrating an overall configuration of a liquid discharge head according to an embodiment.

Next, the configuration of the liquid discharge head 8 according to an embodiment will be described using FIG. 3. FIG. 3 is an exploded perspective view illustrating an overall configuration of the liquid discharge head 8 according to an embodiment.

The liquid discharge head 8 includes a head body 20, a wiring portion 30, a housing 40, and a pair of heatsinks 45. The head body 20 includes the channel member 21, a piezoelectric actuator substrate 22 (see FIG. 4), and a reservoir 23.

In the following description, for convenience, the direction in which the head body 20 is provided in the liquid discharge head 8 may be represented as "lower", and the direction in which the housing 40 is provided with respect to the head body 20 may be represented as "upper".

The channel member 21 of the head body 20 has a substantially flat plate shape, and includes a first surface 21*a* (see FIG. 6), which is one main surface, and the second surface 21*b* (see FIG. 6) located at an opposite side to the first surface 21*a*. The first surface 21*a* includes an opening not illustrated, and liquid is supplied from the reservoir 23 to the inside of the channel member 21 through the opening.

The second surface 21*b* has a plurality of the discharge holes 163 (see FIG. 6) for discharging liquid onto the printing sheet P. The channel member 21 internally has a channel through which liquid flows from the first surface 21*a* to the second surface 21*b*.

The piezoelectric actuator substrate 22 is located on the first surface 21*a* of the channel member 21. The piezoelectric actuator substrate 22 includes a plurality of displacement elements 170 (see FIG. 6). The piezoelectric actuator substrate 22 is electrically connected to a flexible substrate 31 of the wiring portion 30.

The reservoir 23 is located on the piezoelectric actuator substrate 22. The reservoir 23 is provided with openings 23*a* at both end portions in a main scanning direction, which is a direction orthogonal to a sub scanning direction, which is the conveyance direction of the printing sheet P, and parallel to the printing sheet P. The reservoir 23 includes a channel therein, and is supplied with a liquid from the outside through the opening 23*a*. The reservoir 23 supplies liquid to the channel member 21. The reservoir 23 stores liquid to be supplied to the channel member 21.

The wiring portion 30 includes the flexible substrate 31, a wiring board 32, a plurality of driver ICs 33, a pressing member 34, and an elastic member 35. The flexible substrate 31 transmits, to the head body 20, a predetermined signal sent from the outside. As illustrated in FIG. 3, the liquid discharge head 8 according to the embodiment may include two flexible substrates 31.

The flexible substrate 31 has one end portion electrically connected to the piezoelectric actuator substrate 22 of the head body 20. The other end portion of the flexible substrate 31 is drawn upward in a manner to be inserted through a slit 23*b* of the reservoir 23, and is electrically connected to the wiring board 32. This enables the piezoelectric actuator substrate 22 of the head body 20 and the outside to be electrically connected.

The wiring board 32 is located above the head body 20. The wiring board 32 distributes signals to the plurality of driver ICs 33.

The plurality of driver ICs 33 is located on a main surface of one of the flexible substrates 31. As illustrated in FIG. 3, in the liquid discharge head 8 according to an embodiment, two driver ICs 33 are provided on each flexible substrate 31, but the number of the driver ICs 33 provided on each flexible substrate 31 is not limited to two.

The driver IC 33 drives the piezoelectric actuator substrate 22 of the head body 20 based on a drive signal sent from the controller 14 (see FIG. 1). With this configuration, the driver IC 33 drives the liquid discharge head 8.

The pressing member 34 has a substantially U shape in cross-sectional view, and presses the driver IC 33 on the flexible substrate 31 toward the heatsink 45 from the inside. As a result, in the embodiment, the heat generated when the driver IC 33 is driven can be efficiently radiated to the outer heatsink 45.

The elastic member 35 is disposed in a manner to be in contact with an outer wall of a pressing portion not illustrated in the pressing member 34. By providing such an elastic member 35, it is possible to reduce the likelihood of the pressing member 34 causing breakage of the flexible substrate 31 when the pressing member 34 presses the driver ICs 33.

The elastic member 35 is made of, for example, double-sided foam tape or the like. For example, by using a non-silicon-based thermal conductive sheet as the elastic member 35, it is possible to improve the heat radiating properties of the driver IC 33. Note that the elastic member 35 does not necessarily have to be provided.

The housing 40 is disposed on the head body 20 in a manner to cover the wiring portion 30. This enables the wiring portion 30 to be sealed with the housing 40. The housing 40 is made of, for example, resin or metal.

The housing 40 has a box shape elongated in the main scanning direction, and includes a first opening 40*a* and a second opening 40*b* at a pair of side surfaces opposed along the main scanning direction, respectively. The housing 40 includes a third opening 40*c* at a lower surface, and a fourth opening 40*d* at an upper surface.

One of the heatsinks 45 is disposed in the first opening 40*a* to close the first opening 40*a*, and the other of the heatsinks 45 is disposed in the second opening 40*b* to close the second opening 40*b*.

The heatsink 45 is provided to extend in the main scanning direction, and is made of metal, alloy, or the like having high heat radiating properties. The heatsink 45 is provided to be in contact with the driver IC 33, and radiates heat generated in the driver IC 33.

The pair of heatsinks 45 is fixed to the housing 40 by screws not illustrated. Therefore, the housing 40 to which the heatsink 45 is fixed has a box shape in which the first opening 40*a* and the second opening 40*b* are closed and the third opening 40*c* and the fourth opening 40*d* are opened.

The third opening 40*c* is positioned to oppose the reservoir 23. The flexible substrate 31 and the pressing member 34 are inserted into the third opening 40*c*.

The fourth opening 40*d* is provided in order to insert a connector (not illustrated) provided on the wiring board 32. When a space between the connector and the fourth opening 40*d* is sealed with resin or the like, liquid, dust, or the like is less likely to enter the housing 40.

The housing 40 includes heat insulating portions 40*e*. The heat insulating portions 40*e* are respectively provided in a manner to be adjacent to the first opening 40*a* and the second opening 40*b*, and are provided in a manner to protrude outward from side surfaces of the housing 40 along the main scanning direction.

The heat insulating portions 40*e* are formed in a manner to extend in the main scanning direction. That is, the heat insulating portions 40*e* are positioned between the heatsinks 45 and the head body 20. By providing the heat insulating portions 40*e* in the housing 40 as described above, heat generated by the driver IC 33 is less likely to be transferred to the head body 20 via the heatsinks 45.

Note that FIG. 3 illustrates an example of the configuration of the liquid discharge head 8, which may further include a member other than the members illustrated in FIG. 3.

Configuration of Head Body

Figure 4:
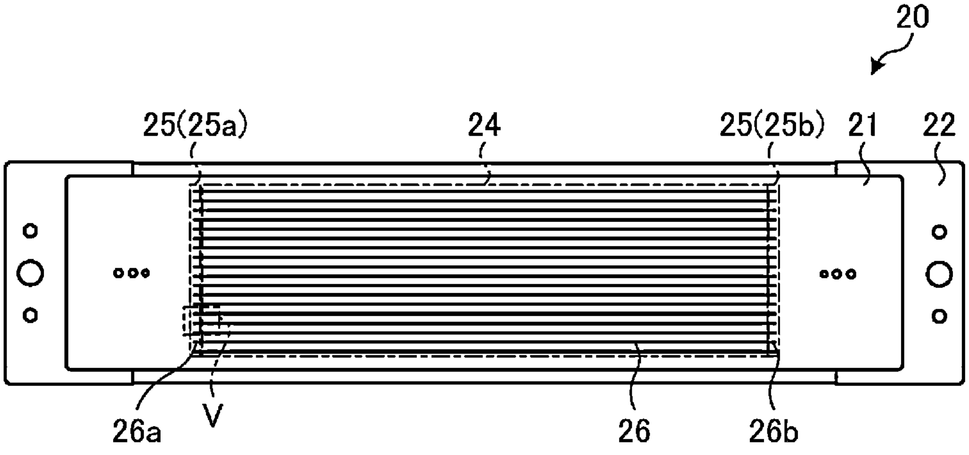
FIG. 4 is a plan view illustrating a configuration of a main part of the liquid discharge head according to an embodiment.
Figure 5:
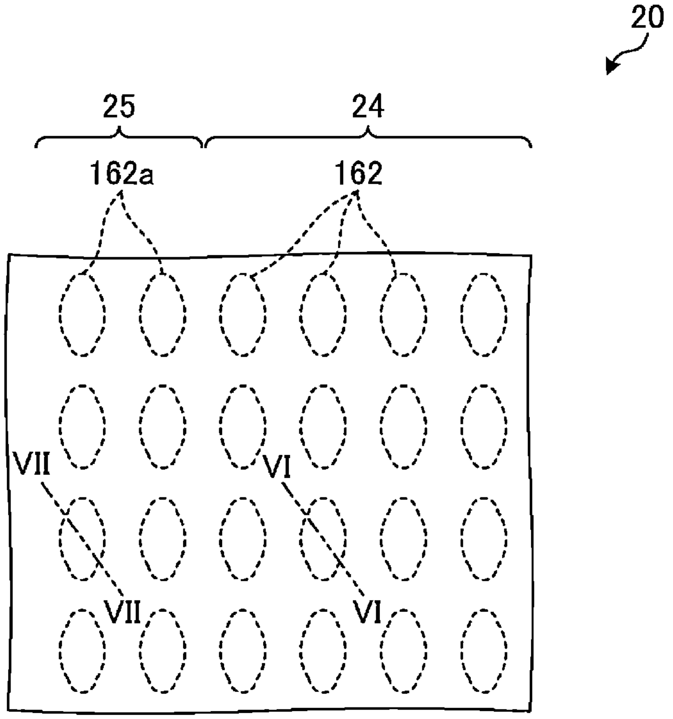
FIG. 5 is an enlarged view of a region V illustrated in FIG. 4.

Next, the configuration of the head body 20 according to the embodiment will be described with reference to FIGS. 4 to 7. FIG. 4 is a plan view illustrating the configuration of a main part of the liquid discharge head according to an embodiment. FIG. 5 is an enlarged view of a region V illustrated in FIG. 4.

As described above, the head body 20 includes the channel member 21 and the piezoelectric actuator substrate 22. The head body 20 includes a discharge region 24 and dummy regions 25 (25*a* and 25*b*) adjacent to the discharge region 24. A plurality of discharge units 26 is located in the discharge region 24. A plurality of dummy units 26*a* is located in the dummy region 25*a*, and a plurality of dummy units 26*b* is located in the dummy region 25*b*. The dummy unit 26*a* and the dummy unit 26*b* have the same structure.

As illustrated in FIG. 5, a plurality of pressurizing chambers 162 is arrayed in the discharge region 24. In the dummy region 25*a*, a plurality of dummy pressurizing chambers 162*a* is arrayed. The pressurizing chamber 162 constitutes a part of the discharge unit 26 (see FIG. 6). The dummy pressurizing chambers 162*a* constitute a part of the dummy unit 26*a* (see FIG. 7).

Figure 6:
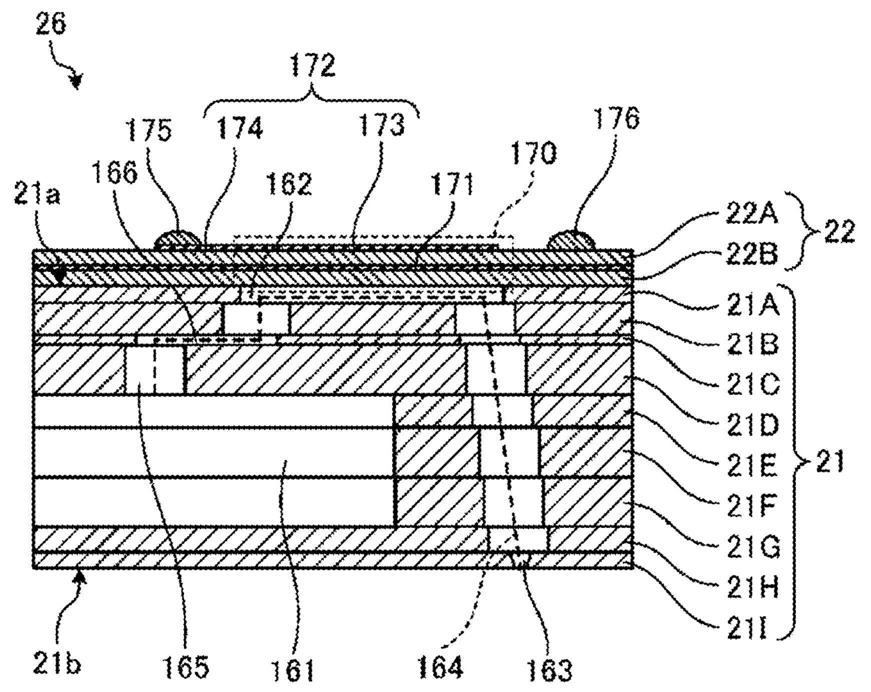
FIG. 6 is a cross-sectional view taken along line VI-VI illustrated in FIG. 5.

FIG. 6 is a cross-sectional view taken along line VI-VI illustrated in FIG. 5. As illustrated in FIG. 6, the channel member 21 has a layered structure layering a plurality of plates. In these plates, a cavity plate 21A, a base plate 21B, an aperture plate 21C, a supply plate 21D, manifold plates 21E, 21F, and 21G, a cover plate 21H, and a nozzle plate 21I are positioned in this order from the first surface 21*a* side of the channel member 21.

A large number of holes are formed in the plates constituting the channel member 21. The thickness of each plate is about 10 μm to 300 μm. This can increase the accuracy of forming the hole. The plates are layered in alignment such that these holes communicate with one another to constitute an individual channel 164 and a supply manifold 161.

In the channel member 21, the individual channel 164 connects between the supply manifold 161 and the discharge hole 163. The supply manifold 161 is located on the second surface 21*b* side inside the channel member 21, and the discharge hole 163 is located on the second surface 21*b* of the channel member 21.

The individual channel 164 includes the pressurizing chamber 162 and an individual supply channel 165. The pressurizing chamber 162 is located on the first surface 21*a* of the channel member 21, and the individual supply channel 165 is a channel connecting the supply manifold 161 and the pressurizing chamber 162.

The individual supply channel 165 includes an aperture 166 having a narrower width than other parts. Since the aperture 166 is narrower than the other parts of the individual supply channel 165, the channel resistance is high. As described above, when the channel resistance of the aperture 166 is high, the pressure generated in the pressurizing chamber 162 hardly escapes to the supply manifold 161.

The piezoelectric actuator substrate 22 includes piezoelectric ceramic layers 22A and 22B, a common electrode 171, an individual electrode 172, a connection electrode 175, a dummy connection electrode 176, and a surface electrode (not illustrated).

In the piezoelectric actuator substrate 22, the piezoelectric ceramic layer 22B, the common electrode 171, the piezoelectric ceramic layer 22A, and the individual electrode 172 are laminated in this order.

The piezoelectric ceramic layers 22A and 22B each have a thickness of about 20 μm. Both layers of the piezoelectric ceramic layers 22A and 22B extend across the plurality of pressurizing chambers 162. For the piezoelectric ceramic layers 22A and 22B, a lead zirconate titanate (PZT)-based ceramic material having ferroelectricity can be used.

The common electrode 171 is formed over substantially the entire surface in the plane direction in a region between the piezoelectric ceramic layer 22A and the piezoelectric ceramic layer 22B. That is, the common electrode 171 overlaps all the pressurizing chambers 162 in the region opposed to the piezoelectric actuator substrate 22. The common electrode 171 has a thickness of about 2 μm. For the common electrode 171, a metal material such as an Ag—Pd-based metal material can be used.

The individual electrode 172 includes an individual electrode body 173 and an extraction electrode 174. The individual electrode body 173 is located in a region opposed to the pressurizing chamber 162 on the piezoelectric ceramic layer 22B. The individual electrode body 173 is slightly smaller than the pressurizing chamber 162 and has a shape substantially similar to that of the pressurizing chamber 162.

The extraction electrode 174 is extracted from the individual electrode body 173. The connection electrode 175 is located at a part at one end of the extraction electrode 174, the part extracted to the outside of the region opposed to the pressurizing chamber 162. For the individual electrode 172, for example, a metal material such as an Au-based metal material can be used.

The connection electrode 175 is located on the extraction electrode 174 and has a convex shape with a thickness of about 15 μm. The connection electrode 175 is electrically joined to an electrode provided on the flexible substrate 31 (see FIG. 3). For the connection electrode 175, for example, silver-palladium containing glass frit can be used.

The dummy connection electrode 176 is located on the piezoelectric ceramic layer 22A so as not to overlap with various electrodes such as the individual electrode 172. The dummy connection electrode 176 connects the piezoelectric actuator substrate 22 and the flexible substrate 31 to increase connection strength.

The dummy connection electrode 176 uniformizes distribution of contact positions between the piezoelectric actuator substrate 22 and the piezoelectric actuator substrate 22, and stabilizes electrical connection. The dummy connection electrode 176 is preferably formed of a material and by a process equivalent to that of the connection electrode 175.

The surface electrode is located on the piezoelectric ceramic layer 22A while avoiding the individual electrode 172. The surface electrode is connected to the common electrode 171 via a via hole formed in the piezoelectric ceramic layer 22A. Therefore, the surface electrode is grounded and held at the ground potential. The surface electrode is preferably formed of a material and by a process equivalent to that of the individual electrode 172.

The plurality of individual electrodes 172 is electrically connected individually to the controller 14 (see FIG. 1) each via the flexible substrate 31 and the wiring in order to individually control the potential. Then, when the individual electrode 172 and the common electrode 171 are set to different potentials and an electric field is applied in the polarization direction of the piezoelectric ceramic layer 22A, a part applied with the electric field in the piezoelectric ceramic layer 22A operates as an active part that is distorted by the piezoelectric effect.

That is, the portions opposed to the pressurizing chamber 162 in the individual electrode 172, the piezoelectric ceramic layer 22A, and the common electrode 171 in the piezoelectric actuator substrate 22*b* constitute the displacement element 170. When the displacement element 170 undergoes unimorph deformation, the pressurizing chamber 162 is pressed, and liquid is discharged from the discharge hole 163. That is, the displacement element 170 functions as a pressurizer that deforms the pressurizing chamber 162. The discharge hole 163 is an example of a nozzle penetrating the nozzle plate 21I.

Figure 7:
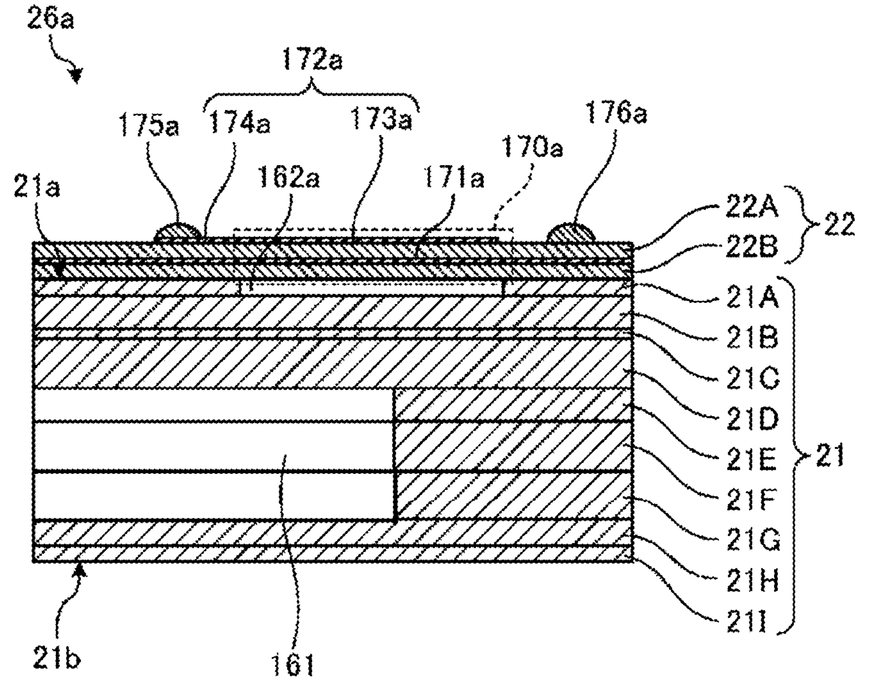
FIG. 7 is a cross-sectional view taken along line VII-VII illustrated in FIG. 5.

FIG. 7 is a cross-sectional view taken along line VII-VII illustrated in FIG. 5. As illustrated in FIG. 7, the dummy unit 26*a* includes the dummy pressurizing chamber 162*a* and a dummy pressurizer (displacement element 170*a*). The dummy unit 26*a* has the same configuration as that of the discharge unit 26 except not including the discharge hole 163, the individual channel 164, the individual supply channel 165, and an opening corresponding to the aperture 166 illustrated in FIG. 6.

The piezoelectric actuator substrate 22 includes the piezoelectric ceramic layers 22A and 22B, a common electrode 171*a*, an individual electrode 172*a*, a connection electrode 175*a*, a dummy connection electrode 176*a*, and a surface electrode (not illustrated).

In the piezoelectric actuator substrate 22, the piezoelectric ceramic layer 22B, the common electrode 171*a*, the piezoelectric ceramic layer 22A, and the individual electrode 172*a* are laminated in this order. Both layers of the piezoelectric ceramic layers 22A and 22B extend across the plurality of dummy pressurizing chambers 162*a*.

The common electrode 171*a* is formed over substantially the entire surface in the plane direction in a region between the piezoelectric ceramic layer 22A and the piezoelectric ceramic layer 22B. That is, the common electrode 171*a* overlaps all the dummy pressurizing chambers 162*a* in the region opposed to the piezoelectric actuator substrate 22. The common electrode 171*a* can be formed in the same manner as the common electrode 171.

The individual electrode 172*a* includes an individual electrode body 173*a* and an extraction electrode 174*a*. The individual electrode body 173*a* is located in a region opposed to the dummy pressurizing chamber 162*a* on the piezoelectric ceramic layer 22B. The individual electrode body 173*a* is slightly smaller than the dummy pressurizing chamber 162*a* and has a shape substantially similar to that of the dummy pressurizing chamber 162*a*.

The extraction electrode 174*a* is extracted from the individual electrode body 173*a*. The connection electrode 175*a* is located at a part at one end of the extraction electrode 174*a*, the part extracted to the outside of the region opposed to the dummy pressurizing chamber 162*a*. The same metal material as that of the individual electrode 172 can be used for the individual electrode 172*a*.

The connection electrode 175*a* is located on the extraction electrode 174*a*. The connection electrode 175*a* is electrically joined to an electrode provided on the flexible substrate 31 (see FIG. 3). The connection electrode 175*a* can have the material and shape similar to those of the connection electrode 175, for example.

The dummy connection electrode 176*a* is located on the piezoelectric ceramic layer 22A so as not to overlap with various electrodes such as the individual electrode 172*a*. The dummy connection electrode 176*a* connects the piezoelectric actuator substrate 22 and the flexible substrate 31 to increase connection strength.

The dummy connection electrode 176*a* uniformizes distribution of contact positions between the piezoelectric actuator substrate 22 and the piezoelectric actuator substrate 22, and stabilizes electrical connection. The dummy connection electrode 176*a* is preferably formed of a material and by a process equivalent to that of the connection electrode 175*a*.

The surface electrode is located on the piezoelectric ceramic layer 22A while avoiding the individual electrode 172*a*. The surface electrode is connected to the common electrode 171*a* via a via hole formed in the piezoelectric ceramic layer 22A. Therefore, the surface electrode is grounded and held at the ground potential. The surface electrode is preferably formed of a material and by a process equivalent to that of the individual electrode 172*a*.

The plurality of individual electrodes 172*a* is electrically connected individually to the controller 14 (see FIG. 1) each via the flexible substrate 31 and the wiring in order to individually control the potential. Then, when the individual electrode 172*a* and the common electrode 171*a* are set to different potentials and an electric field is applied in the polarization direction of the piezoelectric ceramic layer 22A, a part applied with the electric field in the piezoelectric ceramic layer 22A operates as an active part that is distorted by the piezoelectric effect.

That is, the portions opposed to the dummy pressurizing chamber 162*a* in the individual electrode 172*a*, the piezoelectric ceramic layer 22A, and the common electrode 171*a* in the piezoelectric actuator substrate 22 constitute the displacement element 170*a*. When the displacement element 170*a* undergoes unimorph deformation, the dummy pressurizing chamber 162*a* is pressed. That is, the displacement element 170*a* functions as a dummy pressurizer that deforms the dummy pressurizing chamber 162*a*. The dummy units 26*a* and 26*b* have no discharge hole, and liquid is not discharged to the outside even by pressurizing the dummy pressurizing chamber 162*a*. That is, the dummy region 25 is a non-printing region where printing is not performed even when the drive signal is supplied. On the other hand, the discharge region 24 is a printable region where printing is performed in response to a supplied drive signal.

Drive Control of Dummy Unit

Figure 8:
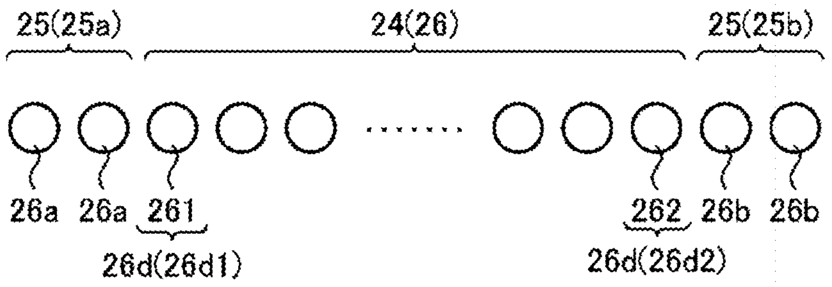
FIG. 8 is an explanatory diagram illustrating an array of a discharge unit and a dummy unit.

FIG. 8 is an explanatory diagram illustrating an array of a discharge unit and a dummy unit. In the example illustrated in FIG. 8, among the plurality of discharge units 26 and the dummy units 26*a* and 26*b* included in the liquid discharge head 8, the discharge units 26 and the dummy units 26*a* and 26*b* arranged side by side in a row along the main scanning direction will be described.

As illustrated in FIG. 8, the discharge unit 26 includes a discharge unit 261 positioned in one end portion region 26*d*1 and a discharge unit 262 positioned in the other end portion region 26*d*2. The dummy units (26*a* and 26*b*) respectively include the dummy unit 26*a* located in the dummy region 25*a* adjacent to the discharge unit 261 and the dummy unit 26*b* located in the dummy region 25*b* adjacent to the discharge unit 262.

Figure 9A:
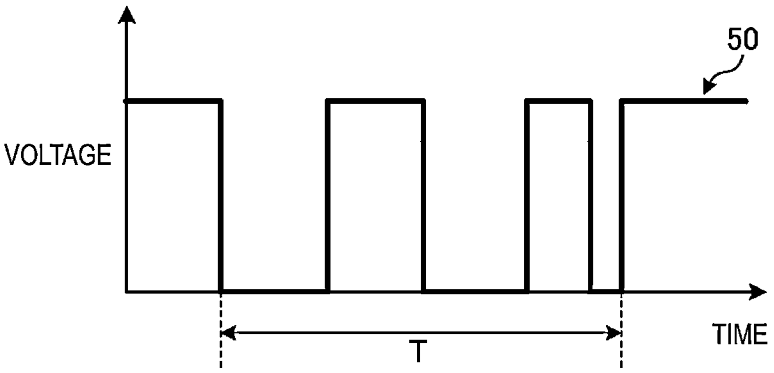
FIG. 9A is a chart showing an example of a drive signal supplied to the discharge unit.

FIG. 9A is a chart showing an example of a drive signal supplied to the discharge unit. A drive signal 50 shown in FIG. 9A includes three pulses. When the drive signal 50 is supplied to the discharge unit 26, time T from the start of the first pulse to the end of the last pulse included in the drive signal 50 is defined as "while the drive signal 50 is being supplied."

Figure 9B:
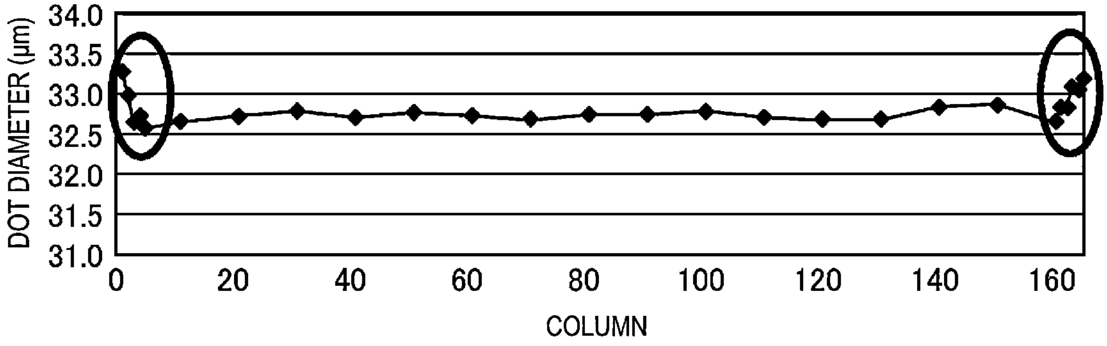
FIG. 9B is an explanatory chart showing a fluctuation of a dot diameter when the dummy unit is not operated.
Figure 9C:
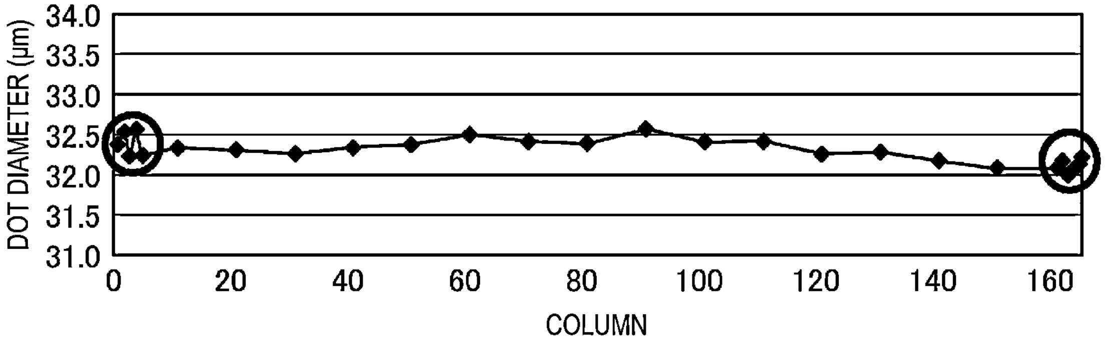
FIG. 9C is an explanatory chart showing a fluctuation of a dot diameter when the dummy unit is operated.

Next, drive control of the dummy units 26*a* and 26*b* will be described. FIG. 9B is an explanatory chart showing a fluctuation of a dot diameter when the dummy unit is not operated. FIG. 9C is an explanatory chart showing a fluctuation of a dot diameter when the dummy unit is operated.

As shown in FIG. 9B, the dots of the droplets discharged from the discharge unit 26 located at both end parts of the discharge region 24 may be larger than the dots of the droplets discharged from the discharge unit 26 located at the central part of the discharge region 24. Such phenomenon is considered to be caused by crosstalk between the plurality of discharge units 26. That is, when the plurality of discharge units 26 are simultaneously driven, vibrations having different phases are transmitted from the other discharge units 26, whereby the discharged droplet amount is reduced as compared with the case of driving one discharge unit 26 alone, and the dots formed by the discharged droplets are reduced. The other discharge units 26 are positioned on both sides of the discharge unit 26 positioned at the center of the row, whereas the other discharge units 26 are positioned only on one side of the discharge unit 26 positioned at the end of the row. Therefore, compared with the discharge unit 26 located at the center of the row, in the discharge unit 26 located at the end of the row, the influence of the crosstalk becomes small, the discharged droplet amount becomes large, and the dots formed by the discharged droplets become large. Note that this phenomenon is most noticeable in the discharge unit 26 that is the endmost in the row, but since the vibration propagates beyond the discharge unit 26, a similar phenomenon may occur in the second or third discharge unit 26 from the end. Then, the difference in dot size is recognized as a density difference, and the quality of the printing target (recording medium) is deteriorated. In particular, when a part having a different density exists in a part of a region having a constant density, or when a part having a different density from the surroundings has a certain size or more, the part is easily recognized as a density unevenness.

In the liquid discharge head 8 according to the embodiment, as illustrated in FIG. 8, the drive signal is supplied to the dummy unit 26*a* located in the dummy region 25*a* adjacent to the discharge unit 261 while the drive signal is being supplied to the discharge unit 261 located at one end portion of the discharge region 24. The drive signal is supplied to the dummy unit 26*b* located in the dummy region 25*b* adjacent to the discharge unit 262 while the drive signal is being supplied to the discharge unit 262 located at the other end portion of the discharge region 24. As a result, as shown in FIG. 9C, it is possible to reduce the difference between the size of the dots by the droplets discharged from the discharge unit 26 (261 and 262) positioned at both end parts of the discharge region 24 and the size of the other dots. Therefore, according to the liquid discharge head 8 of the embodiment, it is possible to reduce the density unevenness generated in the recording medium.

Figure 10A:
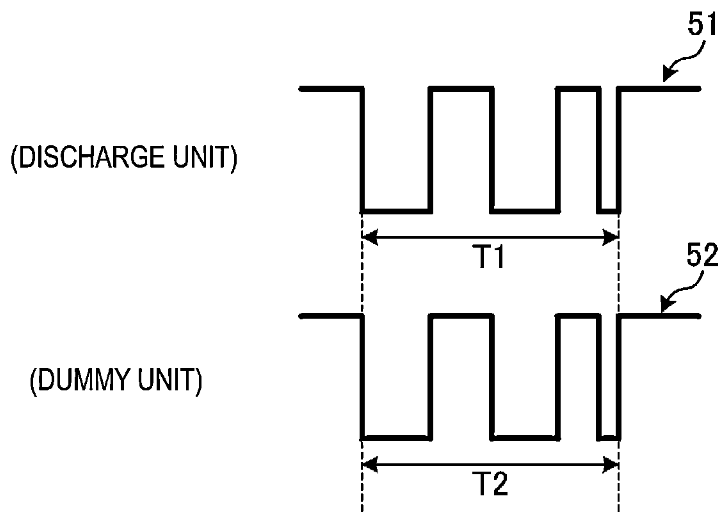
FIG. 10A is a chart showing an example of a drive signal supplied to the dummy unit.
Figure 10B:
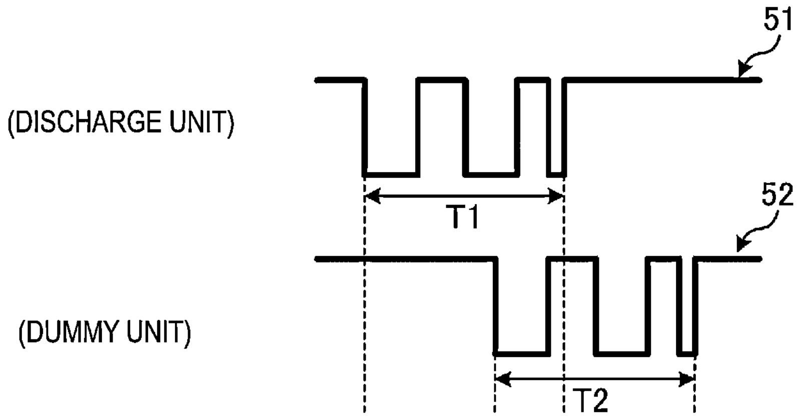
FIG. 10B is a chart showing a variation of the drive signal supplied to the dummy unit.

FIG. 10A is a chart showing an example of a drive signal supplied to the dummy unit, and FIG. 10B is a chart showing a variation of the drive signal supplied to the dummy unit.

As shown in FIG. 10A, a drive signal 52 may be supplied to the dummy units (26*a* and 26*b*) at the same timing as a drive signal 51 (namely, "first drive signal") supplied to the discharge unit 26 located at the end portion of the discharge region 24. That is, the drive signal 52 identical to the drive signal 51 supplied to the discharge unit 26 located in the end portion region 26*d* may be supplied to the dummy units (26*a* and 26*b*) at the same timing as the drive signal 51 supplied to the discharge unit 26 located in the end portion region 26*d*. This can enhance the effect of reducing the density unevenness. As shown in FIG. 10B, as long as the drive signal 52 is supplied while the drive signal 51 is being supplied to the discharge unit 26 located at the end portion of the discharge region 24, the timings at which the drive signals 51 and 52 are supplied need not be the same. Note that time T2 from the start of the first pulse to the end of the last pulse included in the drive signal 52 may be the same as or different from time T1 from the start of the first pulse to the end of the last pulse included in the drive signal 51.

In the example illustrated in FIG. 8, one discharge unit 26 exists in one end portion region of the discharge region 24, but the present invention is not limited to this, and a plurality of the discharge units 26 may exist in one end portion region. The end portion region is a region located at an end of the row of the discharge units 26, and is a region where the discharge unit 26 having the size of the dot larger than the discharge unit 26 located in the central region is located. The dot is formed on the recording medium by the droplets discharged by the identical drive signal when the dummy unit (26*a* or 26*b*) located in the adjacent dummy region 25 (25*a* or 25*b*) is not driven. When a difference of equal to or greater than 1% of the mean value of the size of the dots formed on the recording medium by the droplets discharged from the discharge unit 26 located in the central region exists between the two, it can be determined to "be larger compared to the discharge unit 26 located in the central region". A region located at the center of the row of the discharge units 26, the region where the discharge units 26 of 20% of the total number of the discharge units 26 in one row are located, can be defined as a central region.

Figure 11A:
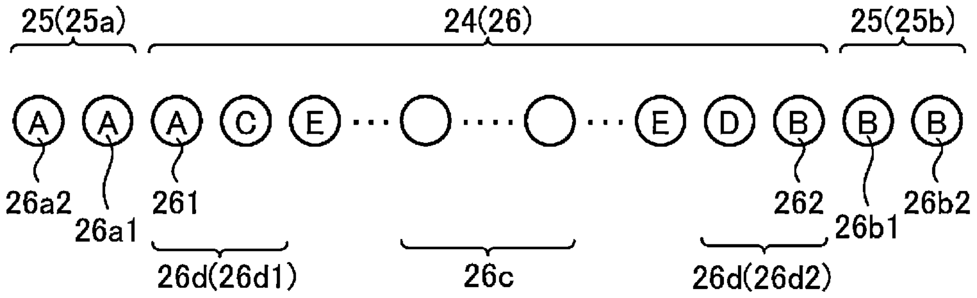
FIG. 11A is an explanatory diagram illustrating an example of drive control of the dummy unit.

As described above, the liquid discharge head 8 of the present embodiment includes the discharge unit 26 and the dummy units (26*a* and 26*b*). The discharge unit 26 includes the nozzle (discharge hole 163) for discharging droplets, the pressurizing chamber 162 connected to the nozzle (discharge hole 163), and the pressurizer (displacement element 170) that is supplied with a drive signal (namely, "first drive signal") and deforms the pressurizing chamber 162. The dummy units (26*a* and 26*b*) include the dummy pressurizing chamber 162*a* and the dummy pressurizer (displacement element 170*a*) that is supplied with a drive signal (namely, "second drive signal") and deforms the dummy pressurizing chamber 162*a*. The liquid discharge head 8 includes the discharge region 24 and the dummy region 25. The discharge region 24 is a region where the plurality of discharge units 26 is disposed in one row. The dummy region 25 is a region where one or more dummy units (26*a* and 26*b*) are disposed adjacent to the discharge region 24 on the extended line of the row of the discharge units 26. The discharge region 24 includes a central region 26*c* (see FIG. 11A) located at the center of the row and the end portion region 26*d* located adjacent to the dummy region 25 at the end portion of the row. The end portion region 26*d* is a region where the discharge unit 26 having the size of the dot larger than the discharge unit 26 located in the central region 26*c* is located. The dot is formed on the recording medium by the droplet discharged by the identical drive signal (namely, "first drive signal") when the dummy units (26*a* and 26*b*) are not driven. In the liquid discharge head 8, a drive signal (namely, "second drive signal") is supplied to the dummy units (26*a* and 26*b*) while the drive signal (namely, "first drive signal") is being supplied to the discharge unit 26 located in the end portion region 26*d*. With such a configuration, it is possible to reduce generation of density unevenness caused by the difference in size of the dots formed on the recording medium by the droplets discharged from the discharge unit 26.

In the liquid discharge head 8 of the present embodiment, the drive signal (namely, "second drive signal") is supplied to the dummy units (26*a* and 26*b*) while the drive signal (namely, "third drive signal") is being supplied to the discharge units 26 (261 and 262) at the position closest to the respective dummy regions 25 (25*a* and 25*b*). Such a configuration can reduce the difference between the size of the dot formed on the recording medium by the droplets discharged from the discharge units 26 (261 and 262) at the position closest to the dummy region 25 and the size of another dot, where the size of the dot formed on the recording medium by the droplet discharged by the identical drive signal tends to be the largest.

FIGS. 11A to 12C are explanatory diagrams illustrating examples of drive control of the dummy unit. In the example illustrated in FIG. 11A, a drive signal (A) identical to the drive signal is supplied to dummy units 26*a*1 and 26*a*2 located in the dummy region 25*a* adjacent to the end portion region 26*d*1 while the drive signal (A) is being supplied to the discharge unit 261 located in the end portion region 26*d*1. A drive signal (B) identical to the drive signal is supplied to dummy units 26*b*1 and 26*b*2 located in the dummy region 25*b* adjacent to the end portion region 26*d*2 while the drive signal (B) is being supplied to the discharge unit 262 located in the end portion region 26*d*2. That is, in the liquid discharge head 8 illustrated in FIG. 11A, the drive signal (A) (namely, "second drive signal") is supplied to the dummy units 26*a*1 and 26*a*2 at the closest and second closest positions to the end portion region 26*d*1 adjacent to the dummy region 25*a* while the drive signal (A) (namely, "third drive signal") is being supplied to the discharge unit 261 at the position closest to the dummy region 25*a*. The drive signal (B) (namely, "second drive signal") is supplied to the dummy units 26*b*1 and 26*b*2 at the closest and second closest positions to the end portion region 26*d*2 adjacent to the dummy region 25*b* while the drive signal (B) (namely, "third drive signal") is being supplied to the discharge unit 262 at the position closest to the dummy region 25*b*. This reduces the difference between the size of the dots due to the droplets discharged from the discharge units 261 and 262 having the highest possibility of having the largest dot and the size of other dots. Note that different drive signals may be supplied to the discharge unit 261 and the dummy units 26*a*1 and 26*a*2, and different drive signals may be supplied to the discharge unit 262 and the dummy units 26*b*1 and 26*b*2.

Figure 11B:
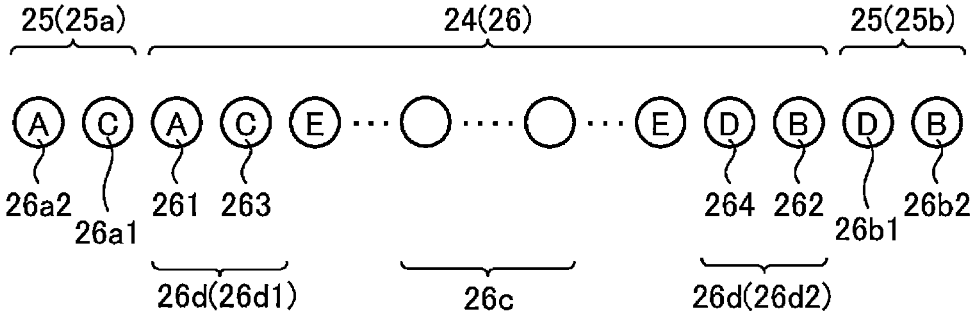
FIG. 11B is an explanatory diagram illustrating an example of drive control of the dummy unit.
Figure 11C:
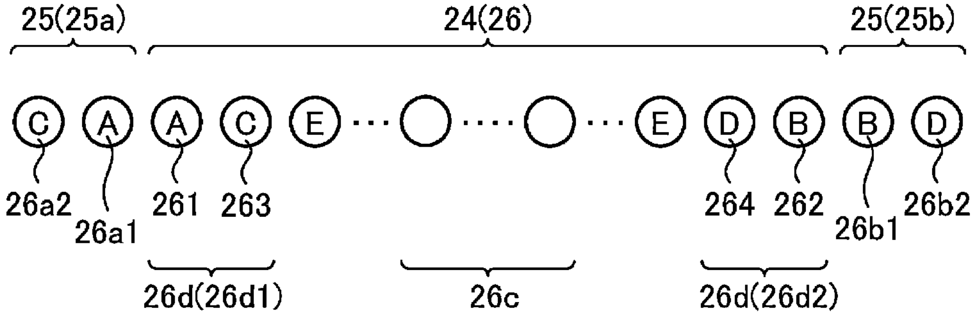
FIG. 11C is an explanatory diagram illustrating an example of drive control of the dummy unit.

As illustrated in FIGS. 11B and 11C, the drive signal (A) identical to the drive signal may be supplied to only one of the dummy units 26*a*1 and 26*a*2 in the dummy region 25*a* adjacent to the end portion region 26*d*1 while the drive signal (A) is being supplied to the discharge unit 261 located in the end portion region 26*d*1 located at one end of the discharge region 24. The drive signal (B) identical to the drive signal may be supplied to only one of the dummy units 26*b*1 and 26*b*2 located in the dummy region 25*b* adjacent to the end portion region 26*d*2 while the drive signal (B) is being supplied to the discharge unit 262 located in the end portion region 26*d*2 located at the other end of the discharge region 24.

That is, in the liquid discharge head 8 illustrated in FIG. 11B, the drive signal (A) (namely, "second drive signal") is supplied to the dummy unit 26*a*2 at the position second closest to the end portion region 26*d*1 adjacent to the dummy region 25*a* while the drive signal (A) (namely, "third drive signal") is being supplied to the discharge unit 261 at the position closest to the dummy region 25*a*. The drive signal (C) (namely, "second drive signal") is supplied to the dummy unit 26*a*1 at the position closest to the end portion region 26*d*1 while a drive signal (C) (namely, "fourth drive signal") is being supplied to a discharge unit 263 at the position second closest to the dummy region 25*a*. Similarly, the drive signal (B) (namely, "second drive signal") is supplied to the dummy unit 26*b*2 located second closest to the end portion region 26*d*2 adjacent to the dummy region 25*b* while the drive signal (B) (namely, "third drive signal") is being supplied to the discharge unit 262 located closest to the dummy region 25*b*. The drive signal (D) (namely, "second drive signal") is supplied to the dummy unit 26*b*1 at the position closest to the end portion region 26*d*2 while a drive signal (D) (namely, "fourth drive signal") is being supplied to a discharge unit 264 at the position second closest to the dummy region 25*b*. In such case, it is possible to reduce the difference between the size of the dots due to the droplets discharged from the discharge units 261 to 264 and the size of other dots. In each of the discharge units 261 and 262 located on the outermost side, vibrations propagating from both sides can be equalized. Note that different drive signals may be supplied to the discharge unit 261 and the dummy unit 26*a*2, and different drive signals may be supplied to the discharge unit 262 and the dummy unit 26*b*2. Different drive signals may be supplied to the discharge unit 263 and the dummy unit 26*a*1, and different drive signals may be supplied to the discharge unit 264 and the dummy unit 26*b*1.

In the liquid discharge head 8 illustrated in FIG. 11C, the drive signal (A) is supplied to the dummy unit 26*a*1 at the position closest to the end portion region 26*d*1 adjacent to the dummy region 25*a* while the drive signal (A) is being supplied to the discharge unit 261 at the position closest to the dummy region 25*a*. The drive signal (C) is supplied to the dummy unit 26*a*2 at the position second closest to the end portion region 26*d*1 while the drive signal (C) is being supplied to the discharge unit 263 at the position second closest to the dummy region 25*a*. Similarly, the drive signal (B) is supplied to the dummy unit 26*b*1 at the position closest to the end portion region 26*d*2 adjacent to the dummy region 25*b* while the drive signal (B) is being supplied to the discharge unit 262 located closest to the dummy region 25*b*. The drive signal (D) is supplied to the dummy unit 26*b*2 at the position second closest to the end portion region 26*d*2 while the drive signal (D) is being supplied to the discharge unit 264 at the position second closest to the dummy region 25*b*. In such case, it is possible to reduce also the difference between the size of the dots by the droplets discharged from the discharge units 263 and 264 and the size of other dots while preferentially reducing the difference between the size of the dots by the droplets discharged from the discharge units 261 and 262 and the size of other dots. Therefore, according to the liquid discharge head 8 of the embodiment, the discharge performance can be improved. Note that different drive signals may be supplied to the discharge unit 261 and the dummy unit 26*a*1, and different drive signals may be supplied to the discharge unit 262 and the dummy unit 26*b*1. Different drive signals may be supplied to the discharge unit 263 and the dummy unit 26*a*2, and different drive signals may be supplied to the discharge unit 264 and the dummy unit 26*b*2.

Figure 12A:
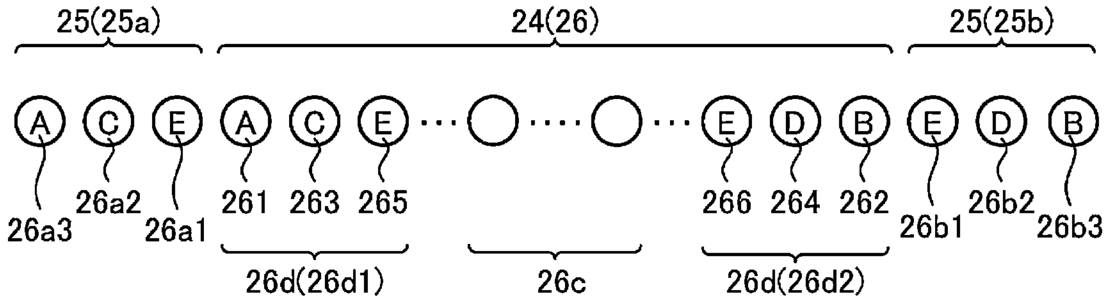
FIG. 12A is an explanatory diagram illustrating an example of drive control of the dummy unit.
Figure 12B:
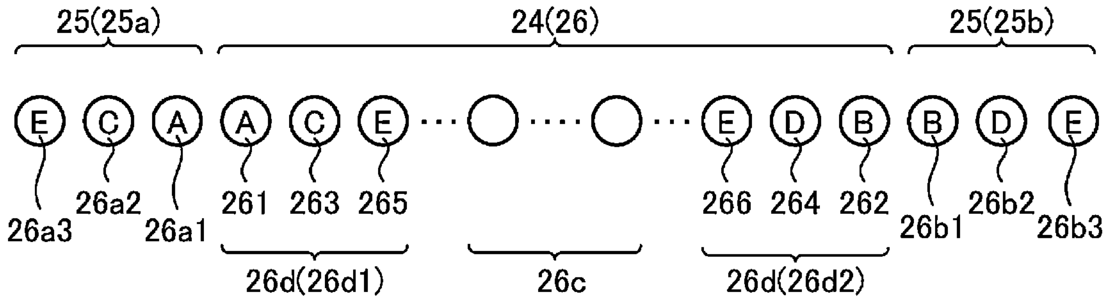
FIG. 12B is an explanatory diagram illustrating an example of drive control of the dummy unit.
Figure 12C:
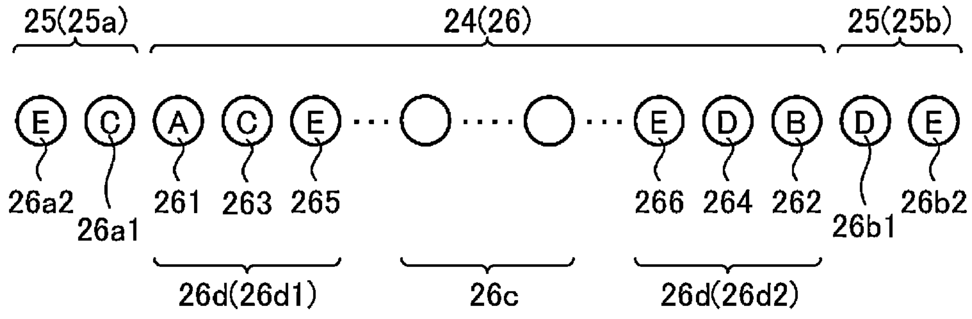
FIG. 12C is an explanatory diagram illustrating an example of drive control of the dummy unit.

FIGS. 12A to 12C illustrate a case where the number of the discharge units 26 positioned in each end portion region 26*d* is 3. FIGS. 12A and 12B illustrate a case where the number of dummy units (26*a* (26*a*1 to 26*a*3) or 26*b* (26*b*1 to 26*b*3)) located in the respective dummy regions 25 (25*a* and 25*b*) is 3.

In the liquid discharge head 8 illustrated in FIG. 12A, the drive signal (A) (namely, "second drive signal") is supplied to the dummy unit 26*a*3 at the position third closest to the end portion region 26*d*1 adjacent to the dummy region 25*a* while the drive signal (A) (namely, "third drive signal") is being supplied to the discharge unit 261 at the position closest to the dummy region 25*a*. The drive signal (C) (namely, "second drive signal") is supplied to the dummy unit 26*a*2 at the position second closest to the end portion region 26*d*1 while the drive signal (C) (namely, "fourth drive signal") is being supplied to the discharge unit 263 at the position second closest to the dummy region 25*a*. The drive signal (E) (namely, "second drive signal") is supplied to the dummy unit 26*a*1 at the position closest to the end portion region 26*d*1 while a drive signal (E) (namely, "fifth drive signal") is being supplied to a discharge unit 265 at the position third closest to the dummy region 25*a*. Similarly, the drive signal (B) (namely, "second drive signal") is supplied to the dummy unit 26*b*3 located third closest to the end portion region 26*d*2 adjacent to the dummy region 25*b* while the drive signal (B) (namely, "third drive signal") is being supplied to the discharge unit 262 located closest to the dummy region 25*b*. The drive signal (D) (namely, "second drive signal") is supplied to the dummy unit 26*b*2 at the position second closest to the end portion region 26*d*2 while the drive signal (D) (namely, "fourth drive signal") is being supplied to the discharge unit 264 at the position second closest to the dummy region 25*b*. The drive signal (E) (namely, "second drive signal") is supplied to the dummy unit 26*b*1 at the position closest to the end portion region 26*d*2 while the drive signal (E) (namely, "fifth drive signal") is being supplied to a discharge unit 266 at the position third closest to the dummy region 25*b*. In such case, it is possible to reduce the difference between the size of the dots due to the droplets discharged from the discharge units 261 to 266 and the size of other dots. Note that different drive signals may be supplied to the discharge unit 261 and the dummy unit 26*a*3, and different drive signals may be supplied to the discharge unit 262 and the dummy unit 26*b*3. Different drive signals may be supplied to the discharge unit 263 and the dummy unit 26*a*2, and different drive signals may be supplied to the discharge unit 264 and the dummy unit 26*b*2. Different drive signals may be supplied to the discharge unit 265 and the dummy unit 26*a*1, and different drive signals may be supplied to the discharge unit 266 and the dummy unit 26*b*1.

In the liquid discharge head 8 illustrated in FIG. 12B, the drive signal (A) (namely, "second drive signal") is supplied to the dummy unit 26*a*1 at the position closest to the end portion region 26*d*1 adjacent to the dummy region 25*a* while the drive signal (A) (namely, "third drive signal") is being supplied to the discharge unit 261 at the position closest to the dummy region 25*a*. The drive signal (C) (namely, "second drive signal") is supplied to the dummy unit 26*a*2 at the position second closest to the end portion region 26*d*1 while the drive signal (C) (namely, "fourth drive signal") is being supplied to the discharge unit 263 at the position second closest to the dummy region 25*a*. The drive signal (E) (namely, "second drive signal") is supplied to the dummy unit 26*a*3 at the position third closest to the end portion region 26*d*1 while the drive signal (E) (namely, "fifth drive signal") is being supplied to the discharge unit 265 at the position third closest to the dummy region 25*a*. Similarly, the drive signal (B) (namely, "second drive signal") is supplied to the dummy unit 26*b*1 at the position closest to the end portion region 26*d*2 adjacent to the dummy region 25*b* while the drive signal (B) (namely, "third drive signal") is being supplied to the discharge unit 262 located closest to the dummy region 25*b*. The drive signal (D) (namely, "second drive signal") is supplied to the dummy unit 26*b*2 at the position second closest to the end portion region 26*d*2 while the drive signal (D) (namely, "fourth drive signal") is being supplied to the discharge unit 264 at the position second closest to the dummy region 25*b*. The drive signal (E) (namely, "second drive signal") is supplied to the dummy unit 26*b*3 at the position third closest to the end portion region 26*d*2 while the drive signal (E) (namely, "fifth drive signal") is being supplied to the discharge unit 266 at the position third closest to the dummy region 25*b*. In such case, it is possible to reduce also the difference between the size of the dots by the droplets discharged from the discharge units 263 to 266 and the size of other dots while preferentially reducing the difference between the size of the dots by the droplets discharged from the discharge units 261 and 262 and the size of other dots. Note that different drive signals may be supplied to the discharge unit 261 and the dummy unit 26*a*1, and different drive signals may be supplied to the discharge unit 262 and the dummy unit 26*b*1. Different drive signals may be supplied to the discharge unit 263 and the dummy unit 26*a*2, and different drive signals may be supplied to the discharge unit 264 and the dummy unit 26*b*2. Different drive signals may be supplied to the discharge unit 265 and the dummy unit 26*a*3, and different drive signals may be supplied to the discharge unit 266 and the dummy unit 26*b*3.

In the liquid discharge head 8 illustrated in FIG. 12C, the drive signal (C) (namely, "second drive signal") is supplied to the dummy unit 26*a*1 at the position closest to the end portion region 26*d*1 adjacent to the dummy region 25*a* while the drive signal (C) (namely, "fourth drive signal") is being supplied to the discharge unit 263 at the position second closest to the dummy region 25*a*. The drive signal (E) (namely, "second drive signal") is supplied to the dummy unit 26*a*2 at the position second closest to the end portion region 26*d*1 while the drive signal (E) (namely, "fifth drive signal") is being supplied to the discharge unit 265 at the position third closest to the dummy region 25*a*. Similarly, the drive signal (D) (namely, "second drive signal") is supplied to the dummy unit 26*b*1 at the position closest to the end portion region 26*d*2 adjacent to the dummy region 25*b* while the drive signal (D) (namely, "fourth drive signal") is being supplied to the discharge unit 264 at the position second closest to the dummy region 25*b*. The drive signal (E) (namely, "second drive signal") is supplied to the dummy unit **26*b*2 at the position second closest to the end portion region 26*d*2 while the drive signal (E) (namely, "fifth drive signal") is being supplied to the discharge unit 266 at the position third closest to the dummy region 25*b*. In such case, in each of the discharge units 261 and 262 located on the outermost side, the vibrations propagating from both sides can be substantially equalized, and therefore the difference between the size of the dots due to the droplets discharged from the discharge units 261 and 262 and the size of other dots can be reduced. Note that different drive signals may be supplied to the discharge unit 263 and the dummy unit 26*a*1, and different drive signals may be supplied to the discharge unit 264 and the dummy unit 26*b*1. Different drive signals may be supplied to the discharge unit 265 and the dummy unit 26*a*2, and different drive signals may be supplied to the discharge unit 266 and the dummy unit 26*b*2**.

In each embodiment described above, the number of the dummy units **26*a* and the number of the dummy units 26*b* are the same, but may be different. The drive signal may be supplied to only one of the dummy unit 26*a* and the dummy unit 26*b*. For example, when the printer 1 includes the plurality of liquid discharge heads 8, the drive signal may be supplied only to the dummy unit located in the dummy region 25 overlapping the discharge region 24 of another liquid discharge head 8 in the conveyance direction of the recording medium. In such a case, the power consumption can be reduced by not supplying the drive signal to the dummy unit in the dummy region 25 located at the end portion of the printing region where the density difference is inconspicuous. When the discharge region 24 of the liquid discharge head 8 includes a plurality of rows of the discharge units 26, performing the drive control of the dummy units 26*a* and 26*b* described above in at least one row can obtain an effect according to the number of rows of the dummy units 26*a* and 26*b* to be driven. For example, the drive control of the dummy units 26*a* and 26*b* described above may be performed every other row. The largest effect can be obtained by performing the drive control of the dummy units 26*a* and 26*b* described above in all the rows. In the embodiment described above, the discharge units 263 to 266** need not be located in the end portion region.

The drive control of the dummy units **26*a* and 26*b* described above is merely an example and may be another aspect. That is, the drive signal is supplied to any one of the dummy units (26*a* or 26*b*) located in the dummy region 25 adjacent to the end portion region 26*d* while the drive signal is being supplied to any one of the discharge units 26 located in the end portion region 26*d***, and thus the above-described effect (improvement in discharge performance) can be expected.

Although each embodiment of the present disclosure has been described above, the present disclosure is not limited to the embodiments described above, and various changes can be made without departing from the spirit of the present disclosure. For example, in the above-described embodiment, an example in which the channel member 21 includes the plurality of layered plates has been described, but the channel member 21 is not limited to the case of including the plurality of layered plates.

For example, the channel member 21 may be configured by forming the supply manifold 161, the individual channel 164, or the like by etching processing.

Further effects and variations can be easily derived by those skilled in the art. Thus, a wide variety of aspects of the present disclosure are not limited to the specific details and representative embodiments represented and described above. Accordingly, various changes are possible without departing from the spirit or scope of the general inventive concepts defined by the appended claims and their equivalents.

The invention claimed is:

1. A liquid discharge head, comprising:

a discharge unit comprising a nozzle configured to discharge a droplet, a pressurizing chamber connected to the nozzle, and a pressurizer supplied with a first drive signal and configured to deform the pressurizing chamber;

a dummy unit comprising a dummy pressurizing chamber and a dummy pressurizer supplied with a second drive signal and configured to deform the dummy pressurizing chamber;

a discharge region that is a region where a plurality of the discharge units is disposed in one row; and a dummy region that is a region where one or more of the dummy units are disposed adjacent to the discharge region on an extended line of the one row of the discharge units, wherein the discharge region comprises a central region located at a center of the one row and an end portion region located adjacent to the dummy region at an end portion of the one row, the end portion region is a region where dots discharged based on the same first drive signal and formed on recording medium are greater in size than those discharged in the central region when the dummy unit is not driven, and during printing, the second drive signal is supplied to the dummy unit to drive the dummy unit while the first drive signal is being supplied to the discharge unit located in the end portion region and the discharge unit located in the end portion region is being driven.

2. The liquid discharge head according to claim 1, wherein an identical drive signal to the first drive signal supplied to the discharge unit located in the end portion region is supplied to the dummy unit at timing identical to the first drive signal supplied to the discharge unit located in the end portion region to drive the dummy unit.

3. The liquid discharge head according to claim 1, wherein the second drive signal is supplied to the dummy unit to drive the dummy unit while a third drive signal is being supplied to a discharge unit at a position closest to the dummy region and the discharge unit at the position closest to the dummy region is being driven.

4. The liquid discharge head according to claim 1, wherein the second drive signal is supplied to dummy units at positions closest and second closest to the end portion region to drive the dummy units at the positions closest and second closest to the end portion region while a third drive signal is being supplied to a discharge unit at a position closest to the dummy region and the discharge unit at the position closest to the dummy region is being driven.

5. The liquid discharge head according to claim 1, wherein the second drive signal is supplied to a dummy unit at a position second closest to the end portion region to drive the dummy unit at the position second closest to the end portion region while a third drive signal is being supplied to a discharge unit at a position closest to the dummy region and the discharge unit at the position closest to the dummy region is being driven, and the second drive signal is supplied to a dummy unit at a position closest to the end portion region to drive the discharge unit at the position closest to the dummy region while a fourth drive signal is being supplied to a discharge unit at a position second closest to the dummy region and the discharge unit at the position second closest to the dummy region is being driven.

6. The liquid discharge head according to claim 1, wherein the second drive signal is supplied to a dummy unit at a position closest to the end portion region to drive the dummy unit at the position closest to the end portion region while a third drive signal is being supplied to a discharge unit at a position closest to the dummy region and the discharge unit at the position closest to the dummy region is being driven, and the second drive signal is supplied to a dummy unit at a position second closest to the end portion region to drive the dummy unit at the position second closest to the end portion region while a fourth drive signal is being supplied to a discharge unit at a position second closest to the dummy region and the discharge unit at the position second closest to the dummy region is being driven.

7. The liquid discharge head according to claim 1, wherein the second drive signal is supplied to a dummy unit at a position closest to the end portion region to drive the dummy unit at the position closest to the end portion region while a fourth drive signal is being supplied to a discharge unit at a position second closest to the dummy region and the discharge unit at the position second closest to the dummy region is being driven, and the second drive signal is supplied to a dummy unit at a position second closest to the end portion region to drive the dummy unit at the position second closest to the end portion region while a fifth drive signal is being supplied to a discharge unit at a position third closest to the dummy region and the discharge unit at the position third closest to the dummy region is being driven.

8. The liquid discharge head according to claim 1, wherein the second drive signal is supplied to a dummy unit at a position third closest to the end portion region to drive the dummy unit at the position third closest to the end portion region while a third drive signal is being supplied to a discharge unit at a position closest to the dummy region and the discharge unit at the position closest to the dummy region is being driven, the second drive signal is supplied to a dummy unit at a position second closest to the end portion region to drive the dummy unit at the position second closest to the end portion region while a fourth drive signal is being supplied to a discharge unit at a position second closest to the dummy region and the discharge unit at the position second closest to the dummy region is being driven, and the second drive signal is supplied to a dummy unit at a position closest to the end portion region to drive the dummy unit at the position closest to the end portion region while a fifth drive signal is being supplied to a discharge unit at a position third closest to the dummy region and the discharge unit at the position third closest to the dummy region is being driven.

9. The liquid discharge head according to claim 1, wherein the second drive signal is supplied to a dummy unit at a position closest to the end portion region to drive the dummy unit at the position closest to the end portion region while a third drive signal is being supplied to a discharge unit at a position closest to the dummy region and the discharge unit at the position closest to the dummy region is being driven, the second drive signal is supplied to a dummy unit at a position second closest to the end portion region to drive the dummy unit at the position second closest to the end portion region while a fourth drive signal is being supplied to a discharge unit at a position second closest to the dummy region and the discharge unit at the position second closest to the dummy region is being driven, and the second drive signal is supplied to a dummy unit at a position third closest to the end portion region to drive the dummy unit at the position third closest to the end portion region while a fifth drive signal is being supplied to a discharge unit at a position third closest to the dummy region and the discharge unit at the position third closest to the dummy region is being driven.

10. A recording device, comprising:

a liquid discharge head described in claim 1; and a transporter configured to convey a recording medium on the liquid discharge head.

11. The recording device according to claim 10 comprising a plurality of liquid discharge heads and configured to supply the second drive signal only to a dummy unit located in the dummy region overlapping a discharge region of another liquid discharge head in a conveyance direction of the recording medium.

12. A recording device, comprising:

a liquid discharge head described in claim 1; and an applicator configured to apply a coating agent to a recording medium.

13. A recording device, comprising:

a liquid discharge head described in claim 1; and a dryer configured to dry a recording medium.

* * * * *